United States Patent
Bacon et al.

(10) Patent No.: US 12,277,547 B2
(45) Date of Patent: Apr. 15, 2025

(54) METHODS AND SYSTEMS FOR USAGE-CONDITIONED ACCESS CONTROL BASED ON A BLOCKCHAIN WALLET

(71) Applicant: Shopify Inc., Ottawa (CA)

(72) Inventors: Chris Bacon, Calgary (CA); Jamie Ly, Dresher, PA (US); Brent Marshall, Kitchener (CA); Sunghyun Lee, Toronto (CA)

(73) Assignee: Shopify Inc., Ottawa (CA)

( * ) Notice: Subject to any disclaimer, the term of this patent is extended or adjusted under 35 U.S.C. 154(b) by 138 days.

(21) Appl. No.: 17/955,631

(22) Filed: Sep. 29, 2022

(65) Prior Publication Data

US 2024/0013202 A1    Jan. 11, 2024

Related U.S. Application Data

(60) Provisional application No. 63/358,271, filed on Jul. 5, 2022.

(51) Int. Cl.
*G06Q 20/36* (2012.01)
*G06Q 20/12* (2012.01)
*G06Q 20/38* (2012.01)

(52) U.S. Cl.
CPC ..... *G06Q 20/3674* (2013.01); *G06Q 20/1235* (2013.01); *G06Q 20/389* (2013.01); *G06Q 2220/00* (2013.01)

(58) Field of Classification Search
None
See application file for complete search history.

(56) References Cited

U.S. PATENT DOCUMENTS 6,401,118 B1    6/2002  Thomas
10,505,726 B1   12/2019 Andon et al.
(Continued)

FOREIGN PATENT DOCUMENTS

CN    110111102    8/2019
CN    110490752    11/2019
(Continued)

OTHER PUBLICATIONS

Antonopoulos, Andreas, "Mastering Bitcoin Unlocking Digital Crypto-Currencies," O'Reilly Media, Inc., all pages. (Year: 2014).*
(Continued)

*Primary Examiner* — Eduardo Castilho
(74) *Attorney, Agent, or Firm* — Rowand LLP

(57) ABSTRACT

Methods and systems for access control to online resources based on non-fungible token gating. A request from a user device may trigger an access control rule having a token-based condition. The system verifies satisfaction of the token-based condition based on a wallet address provided by the user device and blockchain data obtained from a first blockchain network confirming that a non-fungible token meeting the token-based condition is associated with the wallet address. It then obtains data associated with a second blockchain network based on the non-fungible token and, in response, determines, based on the data associated with the second blockchain network, that the non-fungible token is not exhausted due to previous use of the non-fungible token. The system then processes the request from the user device and causes minting of a token on the second blockchain recording usage of the non-fungible token in an access control operation.

20 Claims, 7 Drawing Sheets

(56) References Cited

U.S. PATENT DOCUMENTS

| | | | |
|---|---|---|---|
| 10,929,842 | B1 | 2/2021 | Arvanaghi et al. |
| 11,062,284 | B1 | 7/2021 | Cunningham et al. |
| 11,075,891 | B1* | 7/2021 | Long ................ H04L 9/3213 |
| 11,276,014 | B2 | 3/2022 | Augustine et al. |
| 11,295,363 | B1 | 4/2022 | Kao et al. |
| 11,348,152 | B1* | 5/2022 | Davis ................ G06Q 20/123 |
| 11,455,694 | B2 | 9/2022 | Dinunzio et al. |
| 11,657,428 | B1 | 5/2023 | Ritchie |
| 2005/0208940 | A1 | 9/2005 | Takese |
| 2007/0174079 | A1 | 7/2007 | Kraus |
| 2010/0131386 | A1 | 5/2010 | Shiely et al. |
| 2010/0235218 | A1 | 9/2010 | Erhart et al. |
| 2013/0246146 | A1 | 9/2013 | Fischer et al. |
| 2014/0129422 | A1 | 5/2014 | Zhou |
| 2014/0351953 | A1* | 11/2014 | Bhatia .............. H04N 21/2541 726/27 |
| 2014/0358629 | A1 | 12/2014 | Shivaswamy et al. |
| 2015/0249872 | A1 | 9/2015 | Lee et al. |
| 2015/0324840 | A1 | 11/2015 | Ramnath Krishnan |
| 2015/0363858 | A1 | 12/2015 | Kleinhandler et al. |
| 2016/0171534 | A1 | 6/2016 | Linden |
| 2016/0210674 | A1 | 7/2016 | Allen et al. |
| 2016/0292672 | A1 | 10/2016 | Fay et al. |
| 2017/0011460 | A1 | 1/2017 | Molinari et al. |
| 2017/0116693 | A1* | 4/2017 | Rae ................... G06Q 50/184 |
| 2017/0140408 | A1 | 5/2017 | Wuehler |
| 2017/0155515 | A1 | 6/2017 | Androulaki et al. |
| 2017/0221029 | A1 | 8/2017 | Lund et al. |
| 2017/0330174 | A1* | 11/2017 | Demarinis ......... G06Q 20/3829 |
| 2017/0357966 | A1 | 12/2017 | Chandrasekhar et al. |
| 2018/0108036 | A1 | 4/2018 | Laufenberg et al. |
| 2018/0150869 | A1 | 5/2018 | Finnegan |
| 2019/0066065 | A1 | 2/2019 | Wright et al. |
| 2019/0073666 | A1 | 3/2019 | Ortiz et al. |
| 2019/0130439 | A1 | 5/2019 | Handrigan et al. |
| 2019/0139136 | A1 | 5/2019 | Molinari et al. |
| 2019/0164157 | A1 | 5/2019 | Balaraman |
| 2019/0220836 | A1 | 7/2019 | Caldwell |
| 2019/0266616 | A1 | 8/2019 | Strutton |
| 2019/0294817 | A1 | 9/2019 | Hennebert et al. |
| 2019/0303892 | A1 | 10/2019 | Yantis et al. |
| 2019/0311341 | A1 | 10/2019 | Rice |
| 2020/0005284 | A1* | 1/2020 | Vijayan ................ H04L 9/3247 |
| 2020/0053081 | A1 | 2/2020 | Park et al. |
| 2020/0112446 | A1 | 4/2020 | Yoshihama |
| 2020/0134660 | A1 | 4/2020 | Kadaster |
| 2020/0153607 | A1 | 5/2020 | Shi et al. |
| 2020/0242105 | A1 | 7/2020 | Rich et al. |
| 2020/0244752 | A1 | 7/2020 | Trainor |
| 2020/0364703 | A1 | 11/2020 | Joveski |
| 2020/0379981 | A1 | 12/2020 | Yoon |
| 2021/0014042 | A1 | 1/2021 | Sivathanu |
| 2021/0241351 | A1 | 8/2021 | Francis et al. |
| 2021/0243201 | A1* | 8/2021 | Tandel ................ H04L 9/0897 |
| 2021/0256070 | A1 | 8/2021 | Tran |
| 2021/0279305 | A1* | 9/2021 | Goldston ............ G06Q 20/389 |
| 2021/0366586 | A1 | 11/2021 | Ryan et al. |
| 2021/0383334 | A1 | 12/2021 | Krasnyansky |
| 2021/0390531 | A1* | 12/2021 | Voorhees ............ G06Q 20/367 |
| 2022/0035936 | A1* | 2/2022 | Lin ....................... H04L 9/0894 |
| 2022/0058633 | A1* | 2/2022 | Yantis ................ G06Q 20/389 |
| 2022/0076279 | A1 | 3/2022 | Renaud |
| 2022/0101316 | A1 | 3/2022 | Cramer |
| 2022/0198418 | A1* | 6/2022 | Kang ................... G06Q 20/389 |
| 2022/0210061 | A1* | 6/2022 | Simu ................... H04L 9/3247 |
| 2022/0222364 | A1* | 7/2022 | Roberts ............... G06F 21/64 |
| 2022/0292490 | A1* | 9/2022 | Collen ................. G06Q 10/101 |
| 2022/0318233 | A1 | 10/2022 | Martinez |
| 2022/0351187 | A1* | 11/2022 | Kim .................... G06Q 20/3276 |
| 2022/0398340 | A1 | 12/2022 | Jakobsson |
| 2023/0043095 | A1 | 2/2023 | Miliam |
| 2023/0073545 | A1 | 3/2023 | Kurian |
| 2023/0079195 | A1* | 3/2023 | Matheson ............ G06Q 20/389 705/44 |
| 2023/0086191 | A1* | 3/2023 | Jakobsson ............ H04L 9/3231 705/66 |
| 2023/0120534 | A1* | 4/2023 | Jakobsson ........... G06Q 20/389 705/39 |
| 2023/0195855 | A1 | 6/2023 | Mavromatis |
| 2023/0206218 | A1* | 6/2023 | Defour ................. G06Q 20/02 705/67 |
| 2023/0306412 | A1* | 9/2023 | Gaur .................... G06Q 20/363 |
| 2023/0360029 | A1* | 11/2023 | Pranger ............... G06Q 20/389 |
| 2023/0419315 | A1* | 12/2023 | Togame ............... G06Q 20/389 |
| 2024/0020682 | A1* | 1/2024 | Castagna ........... G06Q 20/3674 |
| 2024/0037593 | A1* | 2/2024 | Navon ................. G06Q 20/389 |
| 2024/0039722 | A1* | 2/2024 | DeLuca ................ H04L 9/50 |
| 2024/0046074 | A1* | 2/2024 | Lewis .................... G10L 15/18 |

FOREIGN PATENT DOCUMENTS

| | | | | |
|---|---|---|---|---|
| CN | 108364173 | | 1/2021 | |
| CN | 109272380 | | 1/2023 | |
| EP | 3748914 | | 12/2020 | |
| EP | 4148643 | A1 * | 3/2023 | ........... G06F 16/245 |
| RU | 2018132715 | A | 3/2020 | |
| TW | 1674543 | | 10/2019 | |
| WO | WO-2013111142 | A1 * | 8/2013 | ......... G06F 21/6218 |
| WO | 2016202952 | | 12/2016 | |
| WO | 2017197110 | | 11/2017 | |
| WO | 2020092900 | | 5/2020 | |
| WO | WO-2022204404 | A1 * | 9/2022 | ............. G06F 21/10 |
| WO | WO-2024039369 | A1 * | 2/2024 | ............. G06F 21/78 |

OTHER PUBLICATIONS

G. Gan, E. Chen, Z. Zhou and Y. Zhu, "Token-Based Access Control," in IEEE Access, vol. 8, pp. 54189-54199, 2020, doi: 10.1109/ACCESS.2020.2979746. (Year: 2020).*

Rafati et al., "DeTi: A Decentralized Ticketing Management Platform," J Netw Syst Manage, 2022, 30(4):62. doi: 10.1007/s10922-022-09675-3. Epub Jul. 2, 20226. PMCID: PMC9315850. (Year: 2022).*

Regner et al., "NFTs in Practice—Non-Fungible Tokens as Core Component of a Blockchain-based Event Ticketing Application." retrieved from https://www.researchgate.net/publication/336057493_NFTs_in_Practice_-_Non-Fungible_Tokens_as_Core_Component_of_a_Blockchain-based_Event_Ticketing_Application (Year: 2019).*

Feulner et al., "Exploring the use of self-sovereign identity for event ticketing systems," Electron Mark, 2022, 32(3):1759-1777. doi: 10.1007/s12525-022-00573-9. Epub Jul. 30, 2022. PMID: 35965736; PMCID: PMC9361939. (Year: 2022).*

M. Madine, K. Salah, R. Jayaraman, A. Battah, H. Hasan and I. Yaqoob, "Blockchain and NFTs for Time-Bound Access and Monetization of Private Data," in IEEE Access, vol. 10, pp. 94186-94202, 2022, doi: 10.1109/ACCESS.2022.3204274. (Year: 2022).*

US Office Action, U.S. Appl. No. 17/473,284, filed Sep. 21, 2023.

US Office Action dated Feb. 23, 2024; U.S. Appl. No. 17/893,370.

US Office Action dated Apr. 21, 2021, U.S. Appl. No. 16/782,561.

US Office Action dated Oct. 7, 2021, U.S. Appl. No. 16/782,561.

US Office Action dated Jan. 20, 2022, U.S. Appl. No. 16/782,561.

US Office Action dated Jul. 26, 2022, U.S. Appl. No. 16/782,561.

Office Action dated Nov. 25, 2022, U.S. Appl. No. 16/782,561.

Office Action dated Apr. 14, 2023, U.S. Appl. No. 16/782,561.

Dialog, Online Searcher, To Be Or Not to Be Competitive Intelligence Tools, Aug. 2019.

US Office Action dated Jul. 27, 2021, U.S. Appl. No. 16/782,556.

Xingxiong Zhu et al; "Application of Blockchain in Document Certification, Asset Trading and Payment Reconciliation"; Journal of Physics: Conference Series, vol. 1187, Issue 5.

European Search Report dated Oct. 10, 2022, EP Application No. 22169579.4.

Sep. 10, 2021, XP055966676, Retrieved from the Internet: URL: http://en.wikipedia.org/w/index.php?title=Non-fungible_token&oldid=3593775#Collectibles.

US Office Action dated Oct. 17, 2022, U.S. Appl. No. 17/344,251.

US Office Action dated Mar. 6, 2023, U.S. Appl. No. 17/479,650.

US Office Action dated Jul. 11, 2023, U.S. Appl. No. 17/475,240.

(56) References Cited

OTHER PUBLICATIONS

US Office Action, U.S. Appl. No. 17/475,240, filed May 9, 2024.
PCT Supplementary International Search Report relating to Application No. PCT/CA2023/050452 dated Jul. 12, 2024.
US Office Action, U.S. Appl. No. 17/903,109, filed Jun. 3, 2024.

* cited by examiner

METHODS AND SYSTEMS FOR USAGE-CONDITIONED ACCESS CONTROL BASED ON A BLOCKCHAIN WALLET

TECHNICAL FIELD

The present disclosure relates to computer-implemented access control systems and methods and, in particular, systems and methods for controlling access to resources using a token-based condition.

BACKGROUND

In many online access control systems, a rule set may determine the conditions under which access is granted or denied to a requesting device. For example, a rule may require that the requesting device provide authorized credentials prior to providing access to a resource. As another example, a rule may provide that a requesting device with a particular characteristic is blocked from accessing a resource, e.g. a certain device type, geographic location, operating system, or other features or characteristics of the requesting device. In some cases, access may be based on blockchain data associated with a blockchain wallet, such as tokens held by the wallet.

BRIEF DESCRIPTION OF THE DRAWINGS

Embodiments will be described, by way of example only, with reference to the accompanying figures wherein.

Like reference numerals are used in the drawings to denote like elements and features.

DETAILED DESCRIPTION OF EMBODIMENTS

Figure 1:
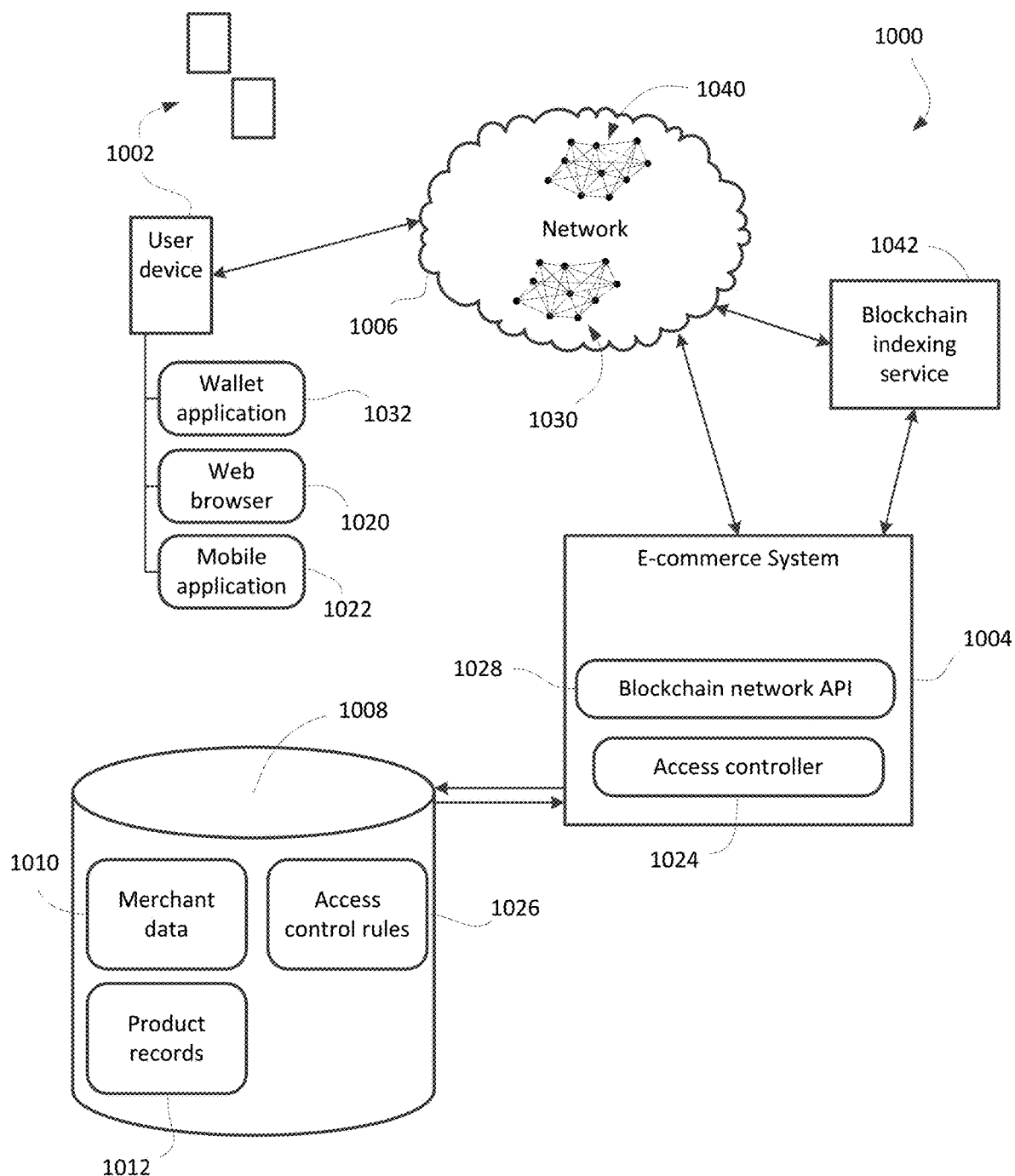
FIG. 1 is a simplified example system.

In one aspect, the present application discloses a computer-implemented method that includes receiving, at a computing system, a request from a user device, the request being associated with an access control rule having a token-based condition; verifying satisfaction of the token-based condition based on a wallet address provided by the user device and blockchain data obtained from a first blockchain network confirming that a non-fungible token meeting the token-based condition is associated with the wallet address; obtaining data associated with a second blockchain network based on the non-fungible token and, in response, determining, based on the data associated with the second blockchain network, that the non-fungible token is not exhausted; and, responsive to the determination that the non-fungible token is not exhausted and the verification of satisfaction of the token-based condition, processing, by the computing system, the request from the user device.

In some implementations, the data associated with the second blockchain network includes a token recorded on the second blockchain network. The token recorded on the second blockchain network may be a token recording previous use of the non-fungible token to satisfy the token-based condition of the access control rule in connection with an earlier request. In some cases, the request and the earlier request are requests for access to a limited access online resource. In some cases, the computing system is an e-commerce system, and wherein the requests for access to a limited access online resource are requests to purchase a product item.

In some implementations, the first blockchain network and the second blockchain network are the same.

In some implementations, the method further includes, after processing the request from the user device, causing minting of a new token on the second blockchain network, wherein the new token includes an identifier of the non-fungible token used to satisfy the access control rule. The new token may further include the wallet address provided by the user device. In some cases, the new token includes metadata identifying a product item associated with the request.

In some implementations, the data associated with the second blockchain network includes a token recorded on the second blockchain network containing a reference to a mutable payload, and wherein the method further includes accessing the mutable payload and determining that the mutable payload does not record more than a maximum number of uses of the non-fungible token. In some cases, the reference points to an interplanetary name system that resolves to the mutable payload on an interplanetary file system, and wherein the mutable payload includes a count of previous uses of the non-fungible token to satisfy the access control rule.

In another aspect, the present application discloses a computing system including one or more processing units, one or more data storage units, and memory storing processor-executable instructions that, when executed by the one or more processing units, are to cause the processing units to carry out the operations of one or more of the methods described herein.

In yet another aspect, a non-transitory, computer readable storage medium is disclosed. The medium may store processor-executable instructions that, when executed, cause one or more processors to carry out the operations of one or more of the methods or processes described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the terms "e-commerce platform" or "e-commerce system" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. The e-commerce platform may serve one merchant in some implementations. The e-commerce platform may be a multi-merchant platform in other cases, where each merchant is able to use some or all of the available services to configure an online storefront and provide commerce services to customers of the online storefront. A multi-merchant e-commerce platform may operate across a range of geographic regions, and may operate in multiple countries, currencies, and time zones.

Some of the examples below refer to a "product record". A product record in this context may refer to data regarding a specific product item, or a specific version of that product item. The data may include details of the product item, technical specifications, narrative description, image(s) of the product item, customer reviews, pricing information, inventory information, shipping information, or any other product data of a similar nature. In some cases a product record may be a web page. In some cases, the product record may be an XML record. The product record may be embodied in any other suitable mark-up language or other coding language.

The growth of blockchain networks has led to the development of non-fungible tokens (NFT). Each NFT is a unique combination of characteristics/attributes and/or media. Each NFT also has a unique token ID.

In many implementations, a smart contract may be created for the purpose of minting and/or tracking NFTs. The Ethereum blockchain network has an associated standard, ERC-721, providing a reference implementation of a smart contract for tracking and managing NFTs. Various other standards, such as ERC-1155 for fungible and non-fungible tokens and/or ERC-20 for fungible tokens, may apply. In some cases, the NFTs generated by a smart contract may form a collection, in that the NFTs generated by that smart contract have some limited universe of possible attributes or characteristics. In some cases, the NFTs in a collection are computer-generated art in which various layers of digital art are made available for pseudo-randomized selection to generate each unique digital media. The layers may correspond to particular characteristics, such as various eyes, mouths, hats, accessories, etc., used to generate a unique digital image of a character. In some other cases, the NFTs in a collection may be images or videos that relate to a particular type of activity, sport, or other interest, such as images or videos of particular football players, video clips from baseball plays, photographs of a specific celebrity or group of celebrities, etc. Example NFT collections include, for example, the "Bored Ape" collection, the "NBA™ TopShot" collection, or the "Invisible Friends" collection.

A smart contract is executable computer code recorded on the blockchain that, when properly "called" in a subsequent blockchain transaction, executes so as to carry out its defined operations. In the case of an NFT smart contract, a minting operation may cause the smart contract to produce a new unique NFT that corresponds to a particular one unique NFT. That unique NFT may be digital art, an image, a video, or a combination thereof in some examples. Each NFT may have associated attributes or characteristics. Example attributes include the elements pseudo-randomly selected for generation of the digital image, such as specific eyes, mouth, accessories, etc., for an image of a character. Another set of example attributes may be the context or characteristics of a particular image or video, such as the identity of the person/player featured, the team or teams involved, the date, the score, the type of play, or other such features.

Once NFTs are minted, they may be made available through an online marketplace in some cases. Various wallets, i.e. network-connected computing devices with blockchain wallet software operating thereon, may initiate blockchain transactions to obtain and/or transfer NFTs. Ownership of an NFT by a wallet is recorded on-chain and is verifiable by third parties. In some cases, a wallet may own a plurality of NFTs. The ownership of those NFTs may be verifiable by third parties based on a query to the blockchain network, i.e. to a blockchain node, providing data from the wallet, such as a public key associated with the wallet. In some cases the query may identify the NFTs by way of unique identifiers, or by way of an identifier for the NFT collection to which they belong. The blockchain node may respond by providing verification that the public key provided is associated with the NFT as reflected in the data recorded on the blockchain. The NFT smart contract may provide functions for verifying NFT ownership data.

While many NFTs have been generated to represent ownership interest in some auto-generated digital media, in other cases NFTs may be used as a "proof-of-purchase" or a receipt or record of ownership or investment. In this context, NFTs may indicate a history of purchases or certain product items and, in some cases, record current ownership of those product items. An NFT may be as simple as a record of purchase (receipt) for various common items from a grocery store. In some cases, the NFT may be a record of ownership of a non-perishable real-world item, such as real estate, a financial instrument, an automobile, etc.

In yet other examples, NFTs may be used as a "ticket" for access or as a "proof-of-attendance". For instance, a concert ticket may be minted and recorded as an NFT, which when validated at a venue (e.g. using a QR code scanner or the like to obtain a wallet identifier and an NFT identifier and then validate ownership via a blockchain query) grants the holder of the user device access to the concert. As another example, an NFT may record the fact of attendance at an event, such as a training course or a social event. NFTs may signal membership in a club, attendance at a restaurant, participation or level or progress in an online game, or any other such events.

Access control systems may rely on pre-generated rule sets that specify conditions for granting or denying access to a resource. An administrator of such a system must usually determine the applicable condition or combination of conditions in advance and embody them in suitable access control rules. The system then, in response to a request for access from a requesting device, retrieves the access control rules and assesses whether the requesting device and/or its present context meets the condition or combination of conditions specified in one of the access control rules. Access to the resource is then granted or denied based on that assessment. In this manner, the system gates access to the resource based on the condition or combination of conditions.

In some situations, access control rules may be set that include conditions relating to token holdings. That is, an access control rule may limit access to the online resource to user devices that have a blockchain wallet associated with ownership of one or more tokens or types of tokens. The tokens may be fungible or non-fungible. The condition may indicate that the token or tokens be from one or more specific collections or categories of tokens. The condition may indicate that the token from a certain collection is to have one or more particular attributes or features. There are a range of token-based access conditions that may be set.

In some examples, the restricted online resource may be a webpage, server login, computer game, livestream, or other such online resource to which access may be controlled. In an illustrative example, the online resource may be an e-commerce product or service. That is, access to one or more products or services available via an e-commerce system or platform may be controlled based on ownership of one or more tokens (e.g. NFTs) having certain characteristics or attributes. In some cases, the restricted access is to a discount, coupon, or points program. In some cases, the restricted access is to a version of a webpage or other online resource associated with the product or service that includes a discount or incentive not otherwise available for that product or service. The online resource may be accessed by a computing device via a webpage or mobile app interface, wherein a remote server, e.g. an e-commerce platform, determines that access by the computing device is permitted based on verification that one or more NFTs meeting the access conditions are associated with the computing device.

To prove ownership of one or more tokens, a user connecting to a system through a user device causes the user device to provide wallet information to the system. This may employ certain WalletConnect protocols, in some cases. The system may challenge the user device using a message, and the user device may provide the system with a wallet address and a digital signature over the message that evidences possession by the user device of the private key that corresponds to a public key associated with the wallet address. The system may cryptographically verify that the digital signature corresponds to the wallet address. The system may then obtain data from a blockchain network regarding the wallet address, for example, ownership data detailing the fungible or non-fungible tokens held by that wallet address. Alternatively, the system may obtain blockchain data detailing the wallet addresses that hold a particular NFT or set of NFTs and may determine whether the wallet address provided by the user device matches one of those obtained in the blockchain data. In this manner, the system is able to determine that the user device is associated with the wallet address, validate using the blockchain which tokens the wallet address holds, and determine whether those tokens satisfy the access condition.

In some cases, the access conditions set for accessing a restricted resource based on token-gating may indicate that a particular NFT or set of NFTs may only be used a maximum number of times to satisfy the access condition. In some cases, the maximum is once. In some implementations, the access condition may specify that the NFT(s) may only be used to satisfy the access condition if not already used to satisfy the same or a similar access condition applicable to a different merchant or class of merchants or to access the same or a similar product/service with another merchant. Other variations may be used in which the access condition imposes a maximum number of times (one or more) that the NFT(s) may have been used to satisfy other gating conditions before the NFT(s) are "exhausted" for that purpose and will no longer be considered to satisfy the access condition.

In one example, an NFT may be used as a "coupon" or the like, such that once it has been used it should not be usable again. In that case, the system must determine whether the NFT has been previously used for the same or a similar purpose, i.e. to gain access to a restricted resource. In the case of a single merchant, the merchant could maintain a private database that tracks NFT usage for access to gated resources in order to determine whether a particular NFT is "exhausted". However, in many cases the access condition may be based on usage with another or any other merchant, meaning that the system would need access to the private databases of all other merchants and/or online marketplaces in order to determine past usage of the NFT. Even if access were available, the system may need to contact and communicate with tens, hundreds, or thousands of independent private databases in an attempt to determine whether a particular NFT was previously used in a gating operation. Moreover, potential transferees of the NFT would have no way of determining in advance whether the NFT has already been used for accessing gated resources, since the potential transferee would have no access to the private databases of a range of merchants and/or online marketplaces.

Accordingly, in some aspects, the present application provides for methods and systems to track and determine NFT usage in connection with access conditions. In some implementations, a separate token is minted to record usage data regarding an NFT when that NFT is used to satisfy an access condition. The token may record the NFT identifier, the wallet address involved, the merchant associated with the access condition, time and data information, product and/or service data associated with the access condition, and other such data regarding usage of the NFT to satisfy a gating condition. The separate token may be referred to as a "NFT usage token" or the like. The separate token may be minted on a second blockchain different from the first blockchain on which the NFT had been minted. The second blockchain may be a layer 2 blockchain in some implementations. In some cases, the second blockchain is the same blockchain as the first blockchain. The separate token may be minted using, for example, a proof of attendance protocol (POAP).

When a system receives a request for access to a restricted resource and identifies an access control rule for the resource that includes a token-based access condition, it determines from blockchain data whether the requesting device has provided a wallet address that contains the required NFT(s). In accordance with the present application, the system then also determines, based on one or more tokens minted on a second blockchain network, whether the NFT(s) is "exhausted", e.g. whether it has previously been used a maximum number of times to satisfy access conditions. If it is not "exhausted", then the system grants access to the restricted resource. Granting access may include processing a request, such as a purchase or checkout request, or otherwise providing access or permission to the requesting device regarding the restricted resource. The tokens that record previous usage of the NFT(s) to satisfy access conditions may have been minted in connection with an access request that occurred on the same system or a different system. That is, the minting may have been triggered by the same system or a different system. The systems may be merchant computing systems, online marketplace systems, multi-tenant e-commerce platforms, or other such computing systems.

Some of the illustrative examples provided below are based on an e-commerce platform in which access to certain product offerings or product discounts are restricted to users that hold a prescribed token or combination of tokens. A merchant account may have an association with an NFT collection. In some cases, the NFT collection may not be the only NFT collection the merchant account has an association with. In some cases, the merchant account may designate the NFT collection as associated with all of the merchant's available products or with a subset of the merchant's available products. The merchant account may include an access rule that specifies token criteria (e.g. possession of an NFT attribute or combination of attributes) or Boolean combinations thereof (e.g. token criteria A AND token criteria B BUT NOT token criteria C or token criteria D) as the access condition for gaining access to at least one of the merchant products. In some cases, the merchant account may further specify a quantity of the restricted-access products available or an intended number of users able to access the restricted-access products.

It will be appreciated that in some cases, only one NFT of a collection may have the specified combination of attributes. In some other cases, many NFTs of a collection may have the specified combination of attributes. The combination may be a single attribute in some examples. The combination of attributes may not include all types of attributes of the NFTs. For example, the combination of attributes in a digital art context may specify a particular style of hat and eye colour. Other attributes of the digital art, including mouth, accessories, etc., may not be part of the condition. In another example, in the context of a sports video clip NFT, like NBA™ TopShots, the condition may specify a particular player, e.g. LeBron James, and a particular type of play, e.g. dunk, but the teams involved, the date, and score may not be part of the condition.

Reference will now be made to FIG. 1, which diagrammatically illustrates a simplified example system 1000 in accordance with an aspect of the present application. In this example, the system 1000 includes a network-connected server, which in this example is an e-commerce system 1004, and a plurality of user devices 1002. The user devices 1002 and e-commerce system 1004 may communicate over a network 1006. The network 1006 may include interconnected wired and/or wireless networks, including the Internet. The user devices 1002 may include a range of computing devices, such as laptops, desktops, tablets, smartphones, and the like.

The e-commerce system 1004 may be implemented using one or more servers. The e-commerce system 1004 may include data storage 1008, which may include one or more databases or other data structures within or accessible to the servers. The data storage 1008 may include merchant data 1010 regarding merchant accounts with the e-commerce system 1004, including merchant identifiers and settings and parameters for respective merchants. The data storage 1008 may further include product records 1012. In some cases, each merchant account has a set of associated product records 1012 reflecting the products or services offered via that merchant account. The product records 1012 may include details regarding one or more products, images, pricing, shipping information, technical parameters, textual description, reviews, or other data regarding the product. Product records 1012 may be grouped into classes and/or subclasses.

The user devices 1002 may include a web browser 1020 and/or a mobile application 1022 through which the user device 1002 is able to connect with the e-commerce system 1004 in order to browse a merchant's online store interface so as to view available products or services. The web pages or other resources served to the user devices 1002 via the web browser 1020 or mobile application 1022 may be generated or obtained from the stored product records 1012. As a user device 1002 searches or browses products from a particular merchant, the e-commerce system 1004 may retrieve the corresponding product records 1012 for causing display of the product data on the user device 1002. In some implementations, the merchant data 1010 may include settings or parameters that configure the UI and presentation served to the user devices 1002, thereby providing users with a merchant-specific storefront within which to browse and purchase items.

The e-commerce system 1004 includes an access controller 1024. The access controller 1024 may be implemented by way of suitable computer executable code for regulating access to some or all of the product records 1012 and other data within the e-commerce system 1004. In one example, the access controller 1024 may limit access to some or all of the features or options available by way of user authentication. That is, user's, such as customers or merchants, accessing the e-commerce system using a remote device must provide valid user credentials to be authenticated. Once authenticated, the user is granted the level of access corresponding to their user type or class. A merchant user may gain access to edit its product records 1012, store design, and some of its merchant data 1010. In some cases, a customer user need not provide any user credentials and is permitted to browse merchant stores or to make purchases in a "guest" mode. If credentials are provided, the user may be "logged in" to a user account that enables access to additional features or saved preferences, including purchase history, loyalty points, saved purchase credentials (e.g. credit card details), or other user-specific features.

In this example, the network 1006 further includes a blockchain network 1030. The blockchain network 1030 may operate in accordance with a blockchain protocol, such as Bitcoin or Ethereum, as examples. The user device 1002 may include a wallet application 1032, which is a blockchain application on the user device 1002 that may store blockchain-related data. In some cases, the wallet application 1032 may securely store public and private key pairs associated with the user device 1002. The public keys may be shared and made publicly available for the purpose of receiving blockchain-based data transfers of fungible or non-fungible tokens. The private keys may be stored securely and confidentially and may be used by the wallet application 1032 in certain signature operations for providing digital signatures that prove ownership of corresponding public keys, among other things. The public keys may represent or be mathematically linked to corresponding wallet addresses. The wallet address may be referenced in blockchain transactions as a sender or recipient of digital assets. A given wallet address may be recorded as the "owner" or holder of one or more digital assets, as reflected by the blockchain. The wallet application 1032 may be referred to as a simplified payment verification (SPV) client in some implementations.

The wallet application 1032, in this example, may include NFT data with regard to one or more NFTs associated with the wallet address. The NFT data may include, in some cases, an NFT identifier, a public key associated with the wallet (e.g. a wallet identifier or address), a transaction identifier associated with ownership of the NFT, an NFT collection identifier, a smart contract identifier, or other such data regarding the NFT and/or its ownership by the wallet address and stored at the user device 1002. In some cases, the NFT data may include additional data regarding the NFT itself, such as associated media (e.g. image or video), attributes, or a textual description.

In some implementations, the wallet application 1032 may be configured to provide data to the e-commerce system, such as wallet address information and/or NFT data. For example, the wallet application 1032 may use an open-source WalletConnect protocol or other such protocol to connect and interact with decentralized applications (dApps). In some cases, the connect protocol may be used to connect the wallet application 1032 to the mobile application 1022. In some cases the connect protocol may be used to connect the wallet application 1032 to the web browser 1020. In short, the wallet application 1032 is configured such that it is able to securely provide wallet address and/or NFT data to the e-commerce system regarding NFTs purportedly owned by the user device 1002, and/or to authenticate the user device's 1002 ownership of certain public keys associated with particular wallet addresses.

The access controller 1024 may be configured to control access to one or more of the product records 1012 based upon access control rules 1026. Each access control rule 1026 may specify one or more product records 1012, or a class of product records 1012, to which it applies. Each access control rule 1026 may be associated with a specified one of the merchant accounts. Each access control rule 1026 may further include a condition for obtaining access to the associated one or more product records 1012 or class of product records 1012. The condition, in these examples, includes ownership of one or more NFTs meeting token criteria, such as being from a specified NFT collection or having a specified set of attributes.

The e-commerce system 1004 and, in particular, the access controller 1024, may be configured to verify, in response to a request from the user device 1002, that the associated wallet address provided by the user device 1002 meets an access condition within an access control rule 1026. The access controller 1024 may be triggered to verify an access condition is satisfied if a restricted access product record is requested during a first phase of a user session, such as during product browsing or product search. The access controller 1024 may alternative or additionally be triggered to verify the same access condition is satisfied if that restricted access product record is referenced when a request for checkout is received and/or a payment operation is initiated.

The access controller 1024 may be configured to obtain a wallet address and a digital signature from one of the user devices 1002, and to validate that the digital signature confirms ownership of a public key corresponding to the wallet address. It may further be configured to store the wallet address, digital signature, and/or message signed by the digital signature in association with the user session.

The e-commerce system 1004 may further include a blockchain network API 1028 configured to obtain blockchain data from the blockchain network 1030, such as ownership data regarding a particular wallet address. The blockchain network API 1028 may be configured to query a blockchain node within the blockchain network. In some implementations, the e-commerce system 1004 itself operates a blockchain node. The blockchain network API 1028 may receive a request for token information from the access controller 1024, which may provide one or more wallet addresses. The blockchain network API 1028 may then query the blockchain network 1030 for token ownership information with respect to the wallet addresses and may receive data specifying the tokens owned by each of the respective wallet addresses according to the blockchain. The blockchain network API 1028 may then pass that token ownership information to the access controller 1024 to enable it to determine whether one or more of the wallet addresses satisfy the access condition(s) of a particular access control rule 1026.

In this example, the network 1006 may include more than one blockchain network, such as a second blockchain network 1040. In some cases, the second blockchain network 1040 uses a different blockchain protocol than the blockchain network 1030. In some cases, the second blockchain network 1040 uses the same blockchain protocol as the blockchain network 1030, but is a layer 2 network, e.g. an extension of the underlying blockchain network 1030 that may be used to enable scaling or for recordal of less significant transactions that can be completed a lower or negligible cost as compared to the blockchain network 1030. The blockchain network API 1028 may be configured to query both the blockchain network 1030 and the second blockchain network 1040 in some cases. In some implementations, separate blockchain APIs may be present for querying the respective blockchain networks.

In some cases, the system 1000 may include a blockchain indexing service 1042 configured to monitor one or more of the blockchain networks 1030, 1040, and to track and index data from those blockchains. The blockchain indexing service 1042 may be configured to respond to queries, such as to provide the current and/or history of token ownership for a particular wallet address, for example. The blockchain network API 1028 may be configured to send query requests to the blockchain indexing service 1042. In some cases, the blockchain indexing service 1042 may be incorporated within the e-commerce system 1004.

The condition in an access control rule 1026 may include ownership of an NFT meeting specified token criteria. Accordingly, the e-commerce system 1004 may obtain (or may have previously obtained) wallet data from the user device 1002 and may query the blockchain network 1030 to validate that the user device 1002 is associated with an NFT as owner according to the blockchain and that the NFT has the requisite certain attributes. The e-commerce system 1004 may determine from the wallet data provided by the user device 1002 whether it has validated its ownership of a wallet address by providing a verified digital signature associated with the address and, if so, the e-commerce system 1004 may then determine whether that wallet address holds any NFTs by querying the blockchain network 1030 (or, equivalently, the blockchain indexing service 1042. In some cases, the wallet data provided by the user device 1002 may include identifier(s) for one or more NFTs in addition to wallet address information. In some cases, a smart contract on-chain within the blockchain network may provide an ownership verification function. For example, in the context of Ethereum, an ERC-721 compliant smart contract may provide the ownerOf( ) function for determining the blockchain-recorded owner of a particular NFT.

Upon confirming that a wallet address provided by the user device 1002 holds the one or more NFTs (or used to hold the one or more NFTs) such that it meets the access condition specified in the access control rule 1026, the access controller 1024 may further determine whether the access control rule 1026 includes a maximum associated with use of the one or more NFTs. That is, the access control rule 1026 may include in the access condition that an NFT only satisfies the condition if it has been used for access control fewer than a maximum number of times. That maximum may be 1 or more. In some cases, the condition may specify that the use counted against the maximum is only use in connection with certain merchants, classes of merchants, certain products or services or classes of products or services, or other such usage details.

In order to determine the usage history with respect to the NFT, the access controller 1024 may query, in some cases via the blockchain network API 1028, the second blockchain network 1040 for usage data regarding the NFT. The query may seek tokens associated with the NFT recorded on the second blockchain. Such tokens may be NFT usage tokens previously minted to record use of the NFT in satisfying a gating condition. The response to the query may provide details of one or more tokens recording use of the NFT in satisfying an access condition. The data obtained may detail the date/time of use, the merchant and/or platform accessed, the product/service accessed, or any other such details regarding the previous use. In cases where the NFT has not been used previously, the response to the query may be a NULL response indicating that there are no tokens recorded on the second blockchain in association with the NFT.

Once the access controller 1024 has obtained usage data from the tokens recorded on the second blockchain, it determines whether the NFT is "exhausted", e.g. whether it has been used the maximum number of times set in the access condition. If so, then the NFT cannot be used to satisfy the access condition and the request for access will be blocked. If the NFT is determined not to be exhausted, then the access condition is satisfied and access is enabled by the access controller 1024. The e-commerce system 1004 then causes minting of a new token on the second blockchain network 1040 to record use of the NFT in satisfying the access condition. The new token may include details of the access request, including the wallet address, the NFT identifier, the merchant, the product/service accessed, or other such data.

Figure 2:
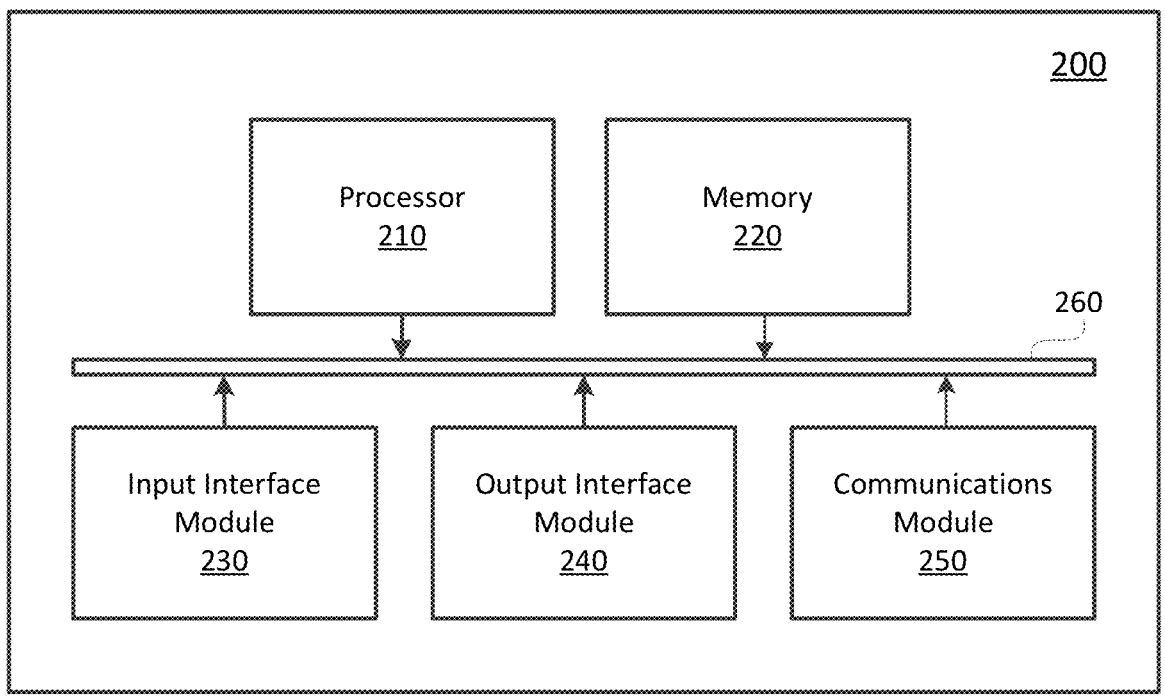
FIG. 2 is a high-level schematic diagram of a computing device.

The e-commerce system 1004 and/or the user devices 1002 may be implemented using one or more computing devices. FIG. 2 is a high-level diagram of an example computing device 200. The example computing device 200 includes a variety of modules. For example, the example computing device 200 may include a processor 210, a memory 220, an input interface module 230, an output interface module 240, and a communications module 250. As illustrated, the foregoing example modules of the example computing device 200 are in communication over a bus 260.

The processor 210 is a hardware processor. The processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 200.

The input interface module 230 allows the example computing device 200 to receive input signals. Input signals may, for example, correspond to input received from a user. The input interface module 230 may serve to interconnect the example computing device 200 with one or more input devices. Input signals may be received from input devices by the input interface module 230. Input devices may, for example, include one or more of a touchscreen input, keyboard, trackball or the like. In some embodiments, all or a portion of the input interface module 230 may be integrated with an input device. For example, the input interface module 230 may be integrated with one of the aforementioned example input devices.

The output interface module 240 allows the example computing device 200 to provide output signals. Some output signals may, for example, allow provision of output to a user. The output interface module 240 may serve to interconnect the example computing device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computing device 200 to communicate with other electronic devices and/or various communications networks. For example, the communications module 250 may allow the example computing device 200 to send or receive communications signals. Communications signals may be sent or received according to one or more protocols or according to one or more standards. For example, the communications module 250 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computing device 200 to communicate using near-field communication (NFC), via Wi-Fi™, via the Ethernet family of network protocols, using Bluetooth™ or via some combination of one or more networks or protocols. Contactless payments may be made using NFC. In some embodiments, all or a portion of the communications module 250 may be integrated into a component of the example computing device 200. For example, the communications module may be integrated into a communications chipset.

Software instructions are executed by the processor 210 from a computer-readable medium. For example, software may be loaded into random-access memory from persistent storage within memory 220. Additionally, or alternatively, instructions may be executed by the processor 210 directly from read-only memory of the memory 220.

Figure 3:
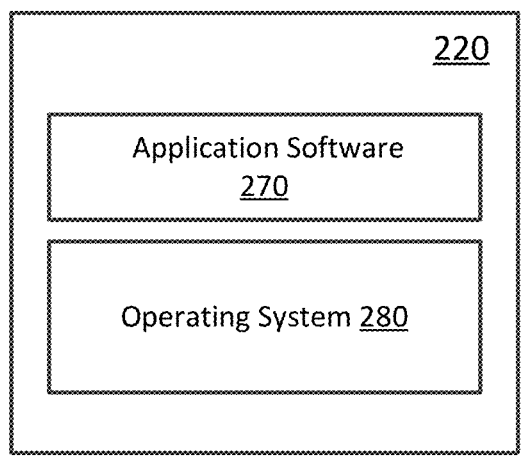
FIG. 3 shows a simplified organization of software components stored in a memory of the computing device of FIG. 2.

FIG. 3 depicts a simplified organization of software components stored in memory 220 of the example computing device 200. As illustrated, these software components include, at least, application software 270 and an operating system 280.

The application software 270 adapts the example computing device 200, in combination with the operating system 280, to operate as a device performing a particular function. While a single application software 270 is illustrated in FIG. 3, in operation, the memory 220 may include more than one application software and different application software may perform different operations. Example application software 270 includes the wallet application 1032 (FIG. 1), the web browser 1020 (FIG. 1), or the mobile application 1022 (FIG. 1).

The operating system 280 is software. The operating system 280 allows the application software 270 to access the processor 210, the memory 220, the input interface module 230, the output interface module 240 and the communications module 250. The operating system 280 may, for example, be iOS™, Android™, Linux™, Microsoft Windows™, or the like.

Figure 4:
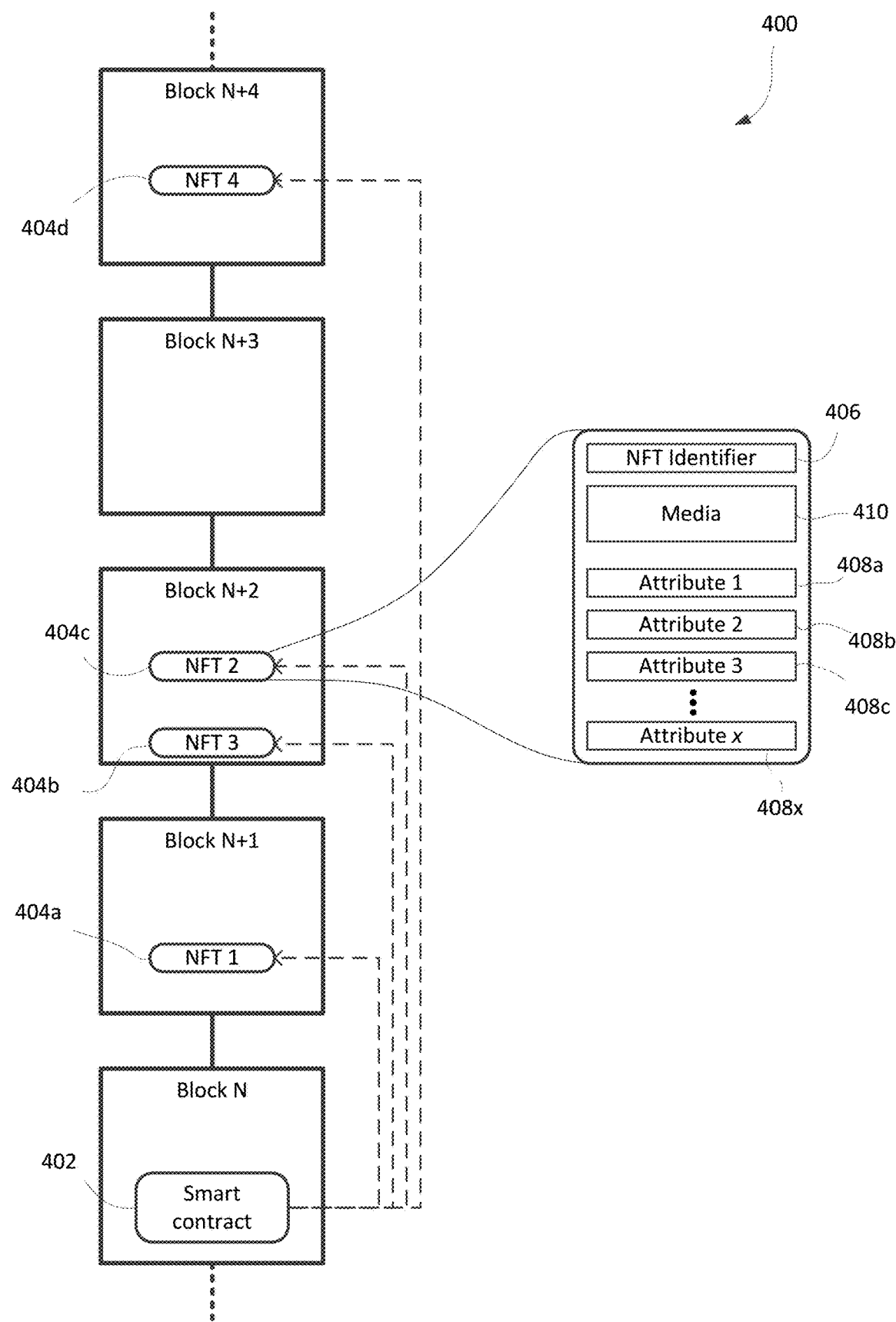
FIG. 4 graphically illustrates an example segment of a blockchain recording non-fungible tokens.

Reference is now made to FIG. 4, which illustrates an example blockchain 400. The blockchain 400 is a record of validated transactions grouped into blocks and successfully "mined" by one of the mining nodes within a blockchain network. Each block is immutable and is linked to the previous block by way of incorporating a hash of the previous block header within its own header. The functioning of a blockchain network and the variations possible under different blockchain protocols will be appreciated by those ordinarily skilled in the art.

A smart contract 402 may be implemented within the blockchain 400. In some cases, like with the Ethereum blockchain, the smart contract 402 may be executable code recorded on chain and may include functions that are available for execution by having those functions called in subsequent transactions. In this example, the smart contract 402 relates to NFT generation and/or management. That is, the smart contract 402 may have functions for minting NFTs, determining/validating ownership of those NFTs, transferring ownership of those NFTs from a current valid owner to a new owner. It will be appreciated that "ownership" is generally associated with an address, e.g. a public key value which may sometime be referred to as a wallet identifier or wallet address. A computing device that holds the corresponding private key may be used to authenticate the computing device as the owner of that public key, thereby enabling the computing device to take actions with respect to the "owned" NFT, such as transferring it to a different wallet address.

When the smart contract 402 is used to mint NFTs, the minting and ownership data for that NFT may be recorded on the blockchain 400, as indicated by 404a, 404b, 404c, 404d (collectively, 404). In some cases, the NFT data recorded on-chain includes, for example, a unique NFT identifier 406. In some instances, the NFT data recorded on-chain may include one or more media files 410 or URI link(s) to one or more media files that are the subject of the NFT. The media files 410 may include, for example, an image file, a video file, an audio file, or combinations thereof.

The NFT data may further include one or more NFT attributes 408 (shown as 408a, 408b, 408c, . . . , 408x). The NFT attributes 408 may include contextual information regarding the NFT, such as a minting date, a category, data regarding the features or characteristics of the media file 410, or any other such attributes of the subject matter of the NFT. The NFT attributes 408 may be in the form of a list of name-value pairs, a hierarchical tree of name-value pairs, a nested structure of attributes, a linked list, an array, or in any other suitable data structure format.

The NFTs 404 minted and managed by the smart contract 402 may be considered part of a collection of NFTs in that they are all governed by the same smart contract 402. In some cases, a collection of NFTs may be minted using different smart contracts or using non-blockchain code for generation of the NFTs and off-chain software for causing recordal of the NFTs on chain in blockchain transactions. Such NFTs may nevertheless be considered part of a single collection of NFTs if they are linked in such a manner as to form a collection, such as having a link or reference within each NFT identifying those NFTs as belonging to a specific collection. In one example, an NFT collection may have a single NFT.

Figure 5:
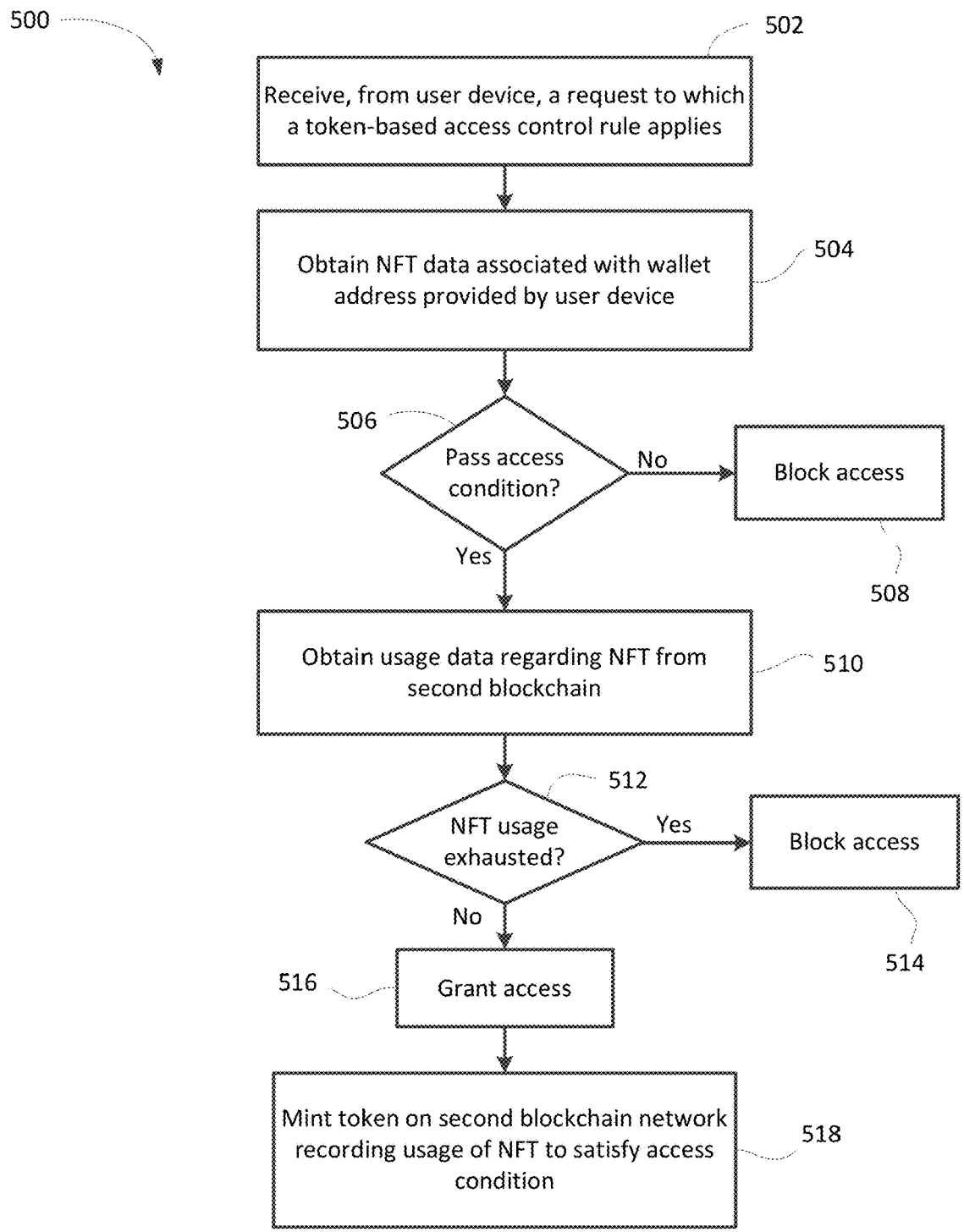
FIG. 5 shows, in flowchart form, one example method of controlling access to an online resource.

Reference will now be made to FIG. 5, which shows, in flowchart form, one example method 500 of controlling access to an online resource. The method 500 may be implemented by a computing platform, such as an e-commerce platform in some cases. In particular, the method 500 may be implemented by way of suitably-programmed software instructions stored in memory on a computing device which, when executed by one or more processors of the computing device, cause the computing device to carry out the described operations. In some cases, the method 500 may be implemented by one or more servers forming an e-commerce platform or system, such as the e-commerce system 1004 (FIG. 1). Although the following method 500 is described in the context of an e-commerce implementation, it will be appreciated that the operations of the method 500 may be generalized to apply in applications and contexts other than e-commerce.

The method 500 is employed by a computing device, such as a server, in the context of a session with a user device. In operation 502, the user device is engaged in communication with the server as part of the session, which may be a browser-based session or an application-based session in some cases.

In operation 502, a request from the user device triggers an access control rule. That is, the request may relate to one or more restricted access online resources for which there is an access control rule. The server is to therefore determine whether the user device satisfies the specified access control condition to be entitled to access the online resource. In this example, the access control rule is a token-based access control rule.

The server obtains a wallet address and a digital signature from the user device. The server may send a wallet query, including a message, and the user device may sign the message using a private key that corresponds to a public key associated with the wallet address. It then replies to the wallet query with the wallet address and the digital signature. The user device may employ Wallet Connect protocols or other similar protocols to protect the private key and enable the digital signing of the message. The message may be sent by the server to the user device. In some cases, the message may be independently generated by the server and the user device based on a previously-agreed upon set of data elements. The wallet address and the validation operations may occur in response to the request of operation 502 or may have occurred earlier in the session.

In operation 504, the server obtains NFT data associated with the wallet address provided by the user device. The NFT data may include data regarding NFTs owned or held by the wallet address. It may include a history of NFT ownership information regarding the wallet address. It may also include details of the NFTs held by the wallet address, including an NFT identifier, attributes, time and date of acquisition, a smart contract identifier, media or links to media associated with the NFT, and other such data. The NFT data may be obtained by querying a blockchain network node or a blockchain indexing service or from any other source of current data reflecting the current state of the blockchain.

Once the server has NFT data for the wallet address it assesses whether the NFT data satisfies the access condition set in the access control rule, as indicated by operation 506. That is, the server determines whether the access condition is satisfied by the NFTs held (or previously held, if the condition so stipulates) by the wallet address. As noted above, the access condition may specify that the requesting device have a wallet address that holds a particular type or class of NFT, an NFT with certain attributes, a combination of NFT attributes or holdings, a minimum quantity of fungible or non-fungible tokens, or other such token-based conditions. If not, then access is blocked in operation 508. Note that blocking access in this context does not necessarily mean terminating or refusing a user session. It may include responding to a request from the user device for a limited access resource by providing a notification regarding the user's ineligibility to access that resource. It may include providing access to an alternative resource that does not have an access control rule, or that has an access control rule that the wallet address satisfies. It may include providing access to the requested resource, but not providing the restricted access to a discount, promotion, or other limited availability offer associated with the resource and to which the access control rule applies.

In this example, the access control rule further includes a condition on the number of times that the NFT (or multiple NFTs) have been used in an access control operation. The condition may be that they have never been used or that they have been used no more than a certain number of times. In some cases, the condition may only count uses if the use was to gain access to the same or a similar product, service, or offer. In some cases, the condition may relate to use in connection with certain merchants or classes of merchants. For example, the condition for access to a limited edition athletic shoe offer may be that the associated NFT not have been used to access restricted offers for athletic shoes from competing manufacturers or retailers.

Accordingly, in operation 510, the server obtains usage data relating to the NFT from a second blockchain. In particular, the server may query the second blockchain. The second blockchain may be the same blockchain on which the NFT is recorded, or may be a different blockchain or a layer 2 blockchain related to the blockchain on which the NFT is recorded. Querying may include sending a query to a blockchain node, to a blockchain indexing service, or to some other computing system configured to provide current blockchain data in response to queries. The query may be based on the NFT identifier or other data unique to the NFT. The response to the query, if anything is found, may be one or more tokens minted to record use of the NFT in a previous access control operation. That is, the one or more tokens may record the fact that the NFT was previously used to satisfy an access condition. The tokens may indicate a date/time of use, the wallet address that held the NFT at the time of use, the product/service/event etc. to which access was gained using the NFT, the merchant or other entity involved in gating access to the product/service/event, and other such data regarding the prior use of the NFT. If nothing is found on the second blockchain relating to the NFT, then the server may determine that the NFT has not been previously used.

Based on the prior usage information obtained from the second blockchain, the server may assess, in operation 512, whether the NFT is "exhausted". Exhaustion of an NFT may be based on a maximum number of uses set in the condition. In some cases, the maximum number of uses may be specified in the NFT itself, e.g. in its metadata or content. In some cases, the maximum number of uses may be set by merchant policy separate from the content of the access control rule, but applicable to all of the merchant's access control rules. In some cases, the maximum number of users may be set by platform policy by the e-commerce system.

The server determines the number of prior uses (which may be limited to uses for specific purposes, such as to access similar goods/services or with certain merchants, as described above) of the NFT to satisfy access conditions, e.g. a count of tokens minted to record use of the NFT, and determines from that count whether the NFT has already reached the maximum number of uses. If so, then the NFT may be deemed "exhausted", at least for the purposes of satisfying the present access control rule. As a result, the server may block access, as indicated by operation 514. Note that blocking access in this context does not necessarily mean terminating or refusing a user session. It may include responding to a request from the user device for a limited access resource by providing a notification regarding the user's ineligibility to access that resource. It may include providing access to an alternative resource that does not have an access control rule, or that has an access control rule that the wallet address satisfies. It may include providing access to the requested resource, but not providing the restricted access to a discount, promotion, or other limited availability offer associated with the resource and to which the access control rule applies.

If the NFT is not determined to be exhausted in operation 512, then in operation 516 the server grants the request for access. As a result it provides the user device with the requested access, which in some cases may include processing a requested transaction, such as a checkout request or payment request, or providing a requested webpage or other online resource to the user device, as examples.

Having granted access because the NFT(s) satisfied the access control rule, the server then also causes minting of a token or tokens on the second blockchain to record the fact that the NFT(s) were used to satisfy an access condition of an access control rule, as indicated by operation 518. Minting of the tokens recording use of the NFT(s) may include sending access or transaction details to a blockchain node or blockchain API for inclusion in a minting operation by the associated smart contract on the second blockchain. The details sent for inclusion in the newly-minted token may include the NFT identifier and/or other data regarding the NFT, the wallet address that currently holds the NFT, the product/service/event or other gated resource for which the NFT was used to gain access, the merchant, or other such data regarding the access control event. The minting operation may occur once access has been granted in operation 516 or subsequently upon confirmation of a purchase event or other event that occurs in connection with the granted access request.

In this manner, subsequent attempts to use the same NFT, whether by the same wallet address or after transfer to a new wallet address, may identify from the second blockchain and the newly-minted token that the NFT was used and what it was used for. This further enables subsequent prospective transferees of the NFT to assess whether the NFT has been previously used and, if so, how many times and for what purposes. The tokens recording NFT usage in gating operations thus provide an immutable history of NFT usage that is publicly available and accurate.

As one illustrative example, a set of NFTs may be minted by a sports team and distributed to the wallets of season's ticket holders, or attendees at a game or event, etc. That NFT may entitle the holder to one or more free or discounted items from a set of merchants, e.g. free or discounted branded merchandise, food items, etc. When a user initiates a request for one of the free or discounted items with a particular merchant, that particular merchant's POS system may obtain a wallet address from the user's user device, determine that the wallet address holds the requisite NFT, and then check the second blockchain to assess whether that specific NFT has already been used with any other merchant to obtain the one or more discounted/free items. If so, then the request will be denied. If not, then the request will be granted and the merchant's system will cause minting of a token recording the fact that the particular NFT was used and how.

Due to the potential delay between use and recordal of the token reflecting that use, in some implementations a computing system, such an e-commerce platform, may maintain a write-ahead buffer tracking NFT usage that has not yet been confirmed by the second blockchain in a token on-chain. When carrying out the determination of prior usage of the NFT in operation 510, the e-commerce system may check both the second blockchain for tokens memorializing use of the NFT and its write-ahead buffer for prospective tokens that have not yet been confirmed.

In some cases, rather than treating use of the NFT in gaining access as a "redemption" or "use" and subject to a maximum number of uses or "exhaustion", the recordal on-chain of prior uses of the NFT in access control events may be used to enhance access. That is, the more often the NFT is used to gain access, as reflected in the on-chain record of access usage, the more valuable that NFT may become, either to other users and/or to merchants. In this scenario the number of times an NFT is used may be a factor in determining whether to increase access or increase discounts, etc., for uses above a minimum threshold count. The minimum threshold count may be set within the NFT itself, within the access control rule, by merchant policy, etc.

In some cases, the token (or the NFT itself) may include a reference to a mutable payload controlled by the creator of the NFT and/or one or more merchants or e-commerce systems. The mutable payload may include a record of the number of times that the NFT has been used to satisfy an access condition to gain access to a gated item/event. In one example, the reference is a pointer to an interplanetary name system (IPNS), which resolves to a record containing the mutable payload on an interplanetary file system (IPFS). In such a scenario, rather than minting a new token recording usage of the NFT in an access control event, the merchant/e-commerce platform accesses the mutable payload to update (e.g. increment) the number of uses recorded in the payload. This may include recording associated usage data, such as time/date, wallet address, merchant identifier, product/service identifier, etc.

Figure 6:
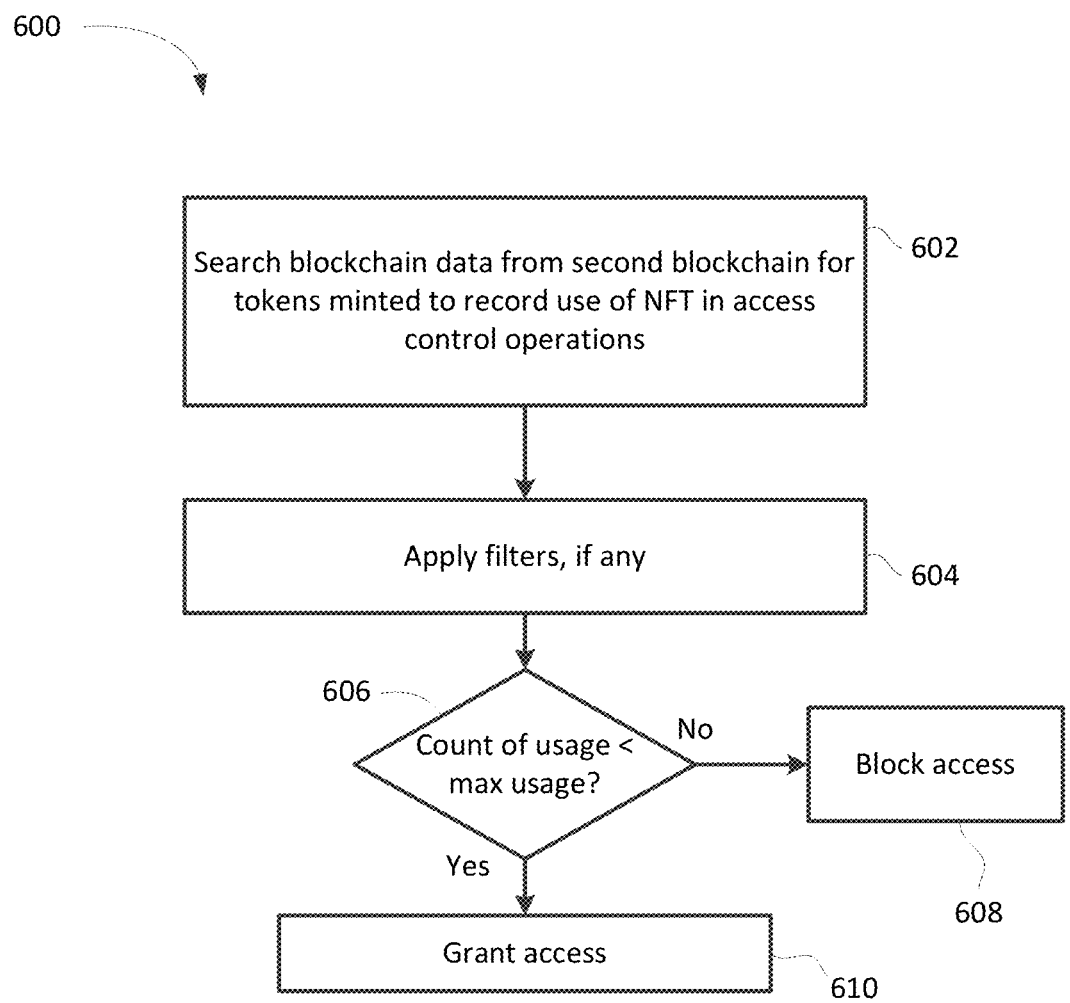
FIG. 6 shows, in flowchart form, one example method of determining whether a non-fungible token is exhausted due to prior use in access control operations.

Reference is now made to FIG. 6, which shows, in flowchart form, one example method 600 of gating access to online resources based on NFT usage data. The method 600 may be implemented by one or more servers forming an e-commerce platform or system, such as the e-commerce system 1004 (FIG. 1). The method 600 relates to a user device connecting to the e-commerce system using a browser or mobile application to exchange communications as part of an e-commerce browsing session. It may be presumed that the user device provides the e-commerce system with at least one wallet address and a respective digital signature for each of the at least one wallet addresses. The system validates that the digital signature corresponds to the wallet address, thereby verifying that the wallet address is owned or controlled by an owner of the user device. In particular, the verification confirms that the user device stores the private key that corresponds to a public key associated with the wallet address. The system obtains NFT data relating to the wallet address that shows that the wallet address holds one or more NFTs that satisfy an access condition relating to the online resource to which the user device has requested access.

The method 600 may be applied to determine whether the NFT has been "exhausted". That is, the method 600 may be applied by the system to grant or deny the requested access based on a count of previous uses of the NFT and an associated maximum number of uses. In operation 602, the system obtains blockchain data from a second blockchain relating to use of the NFT. The blockchain data may include tokens previously minted and recorded on the second blockchain in response to use of the NFT to satisfy an access condition. Each token identified as being associated with use of the NFT indicates a use of that NFT in gaining access to a restricted resource. In some cases, the system may obtain the blockchain data through searching the second blockchain based on the NFT identifier for tokens that reference the NFT identifier. In some cases, the system may obtain the blockchain data from a blockchain indexing service that monitors the second blockchain and responds to a query for data regarding tokens associated with an NFT identifier by providing details of any tokens recorded on-chain in association with that NFT identifier.

In operation 604, the system may filter the blockchain data. The filtering may be based on parameters or conditions set in association with the maximum count of uses associated with the NFT. If the maximum value is set in the access condition, the access condition may specify any associated limits or parameters. If the maximum value is set at a higher level by way of merchant policy or e-commerce platform policy, for instance, the policy setting may indicate any relevant limits or parameters applicable to the maximum count of uses. As an example, the maximum count of uses may indicate that only certain types of uses are counted. For instance, a merchant of clothing may set an access condition that specifies the NFT cannot have been previously used more than twice to gain access to limited edition clothing items. In that example, when determining the number of uses of the NFT reflected in the second blockchain, the system may filter the blockchain data to remove tokens/uses that are not tokens/uses of the NFT to gain access to limited edition clothing items. In another illustrative example, a merchant policy setting may set a condition that any NFT used to gain access to the merchant's restricted access items cannot have been previously used with one or more particular competitors. In such an example, the system may filter the blockchain data to remove tokens recording usage of the NFT unless that use indicates it was used to gain access to items from the one or more particular competitors. In some cases, any use of the NFT to satisfy an access condition may count as a "use" for determining whether a maximum has been reached, in which case there is effectively no filtering applied.

Once any applicable filtering has been provided, the system counts the number of prior uses of the NFT reflected in the tokens recorded on the second blockchain, if any, and compares that count to a maximum value in operation 606. If the count is lower than the maximum permitted uses, then access is granted in operation 610. Otherwise, access is blocked in operation 608.

In any of the above-described example methods or processes it will be understood that certain operations described as occurring in sequence may be implemented in a different sequence or carried out in parallel without impacting the overall functioning of the method or process.

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 7:
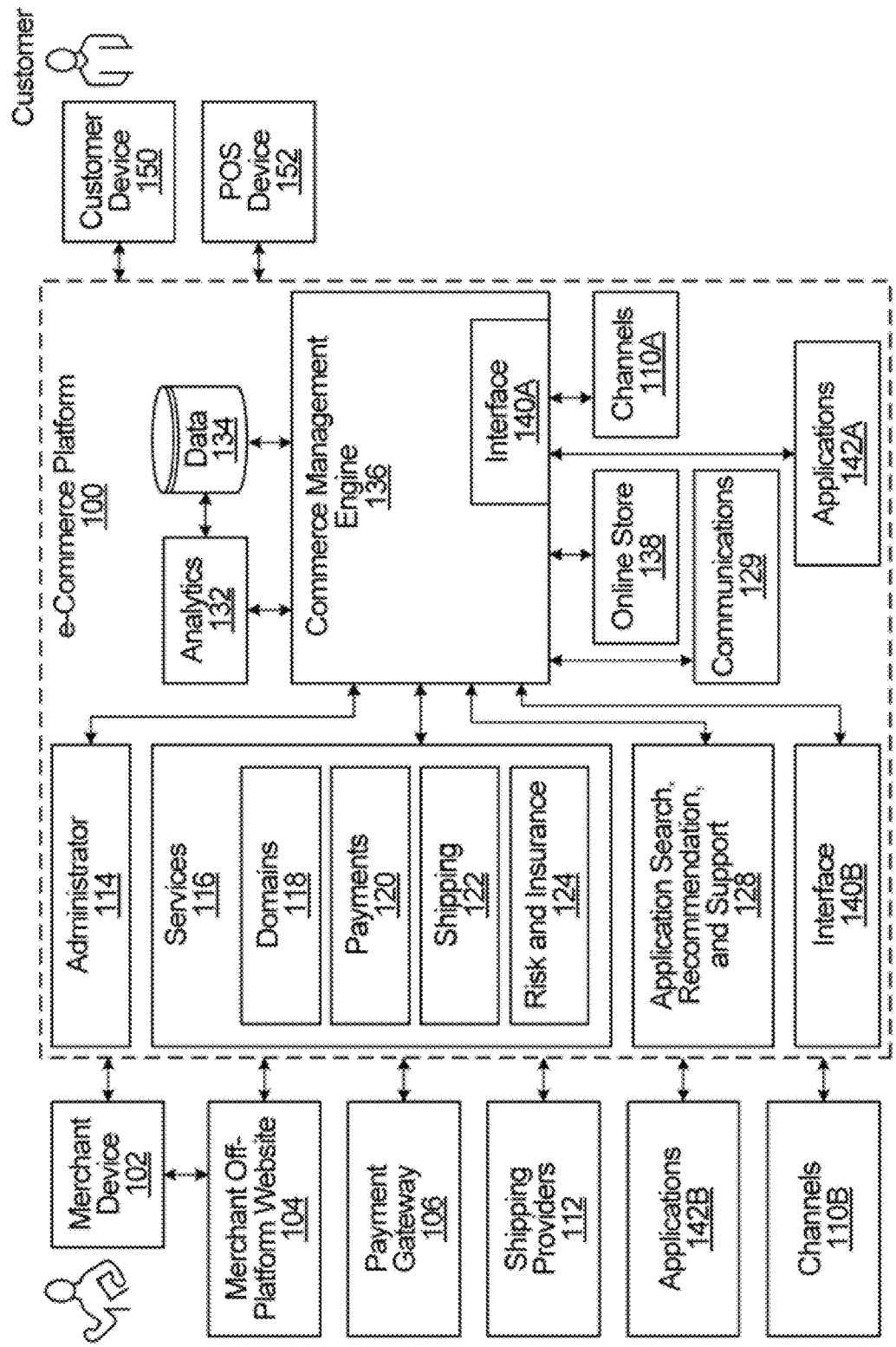
FIG. 7 is a block diagram of an e-commerce platform, in accordance with an example embodiment.

FIG. 7 illustrates an example e-commerce platform 100, according to one embodiment. The e-commerce platform 100 may be exemplary of the e-commerce system 1004 described with reference to FIG. 1. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 7, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like). The example computing device 200 of FIG. 1 may be exemplary of each POS device 152.

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML) template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 8:
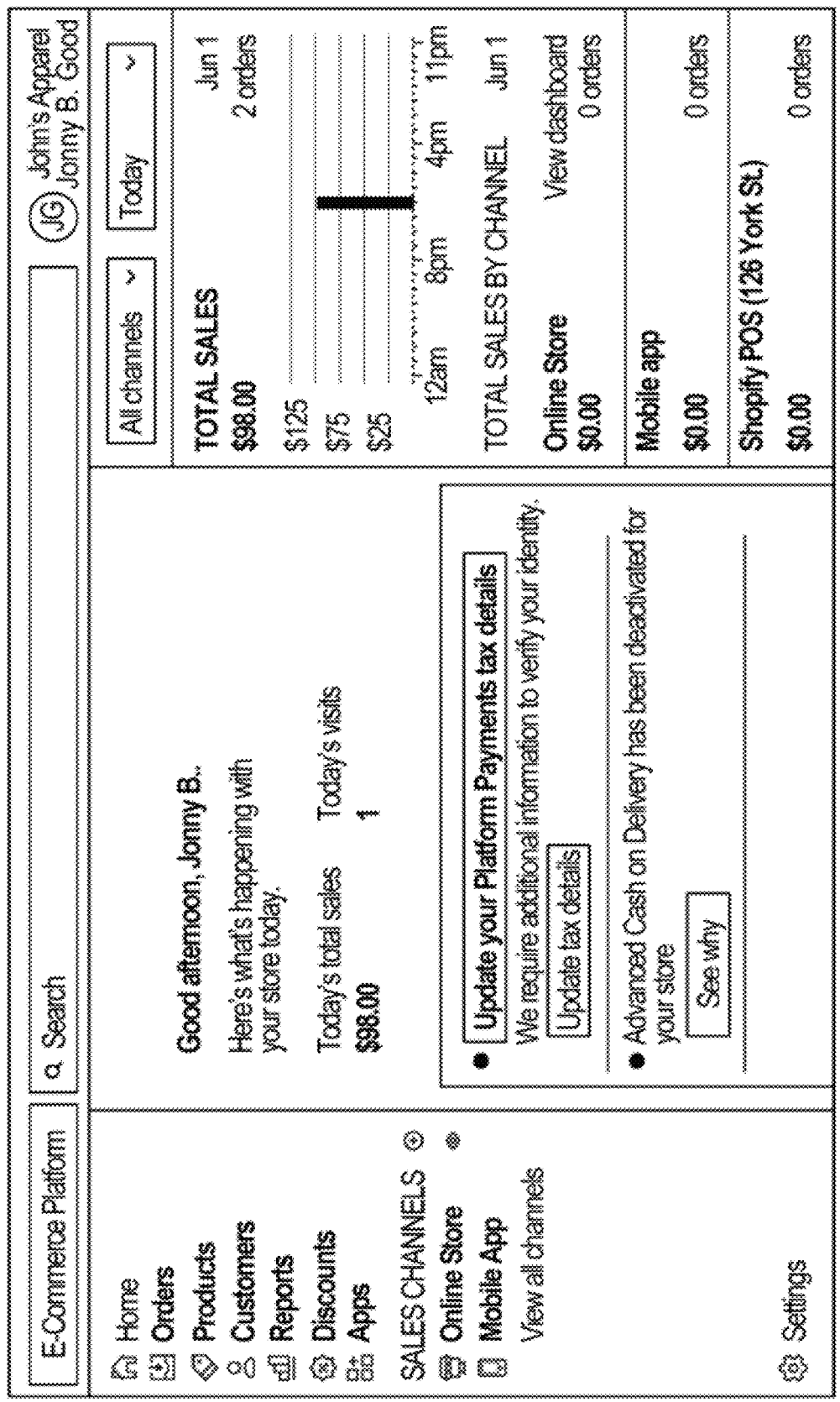
FIG. 8 is an example of a home page of an administrator, in accordance with an example embodiment.

FIG. 8 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 8. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 7, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancellation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method comprising:
receiving, at a computing system, a request from a user device, the request being associated with an access control rule having a token-based condition and a type of use condition;

verifying satisfaction of the token-based condition based on a wallet address provided by the user device and blockchain data obtained from a first blockchain network confirming that a non-fungible token meeting the token-based condition is associated with the wallet address;

obtaining data associated with a second blockchain network based on the non-fungible token wherein the data relates to previous uses of the non-fungible token, and, in response, filtering the data based on the type of use condition to obtain filtered data, and determining, based on the filtered data associated with the second blockchain network, that the non-fungible token is not exhausted; and responsive to the determination that the non-fungible token is not exhausted and the verification of satisfaction of the token-based condition, processing, by the computing system, the request from the user device.

2. The method of claim 1, wherein the data associated with the second blockchain network includes a token recorded on the second blockchain network.

3. The method of claim 2, wherein the token recorded on the second blockchain network is a token recording previous use of the non-fungible token to satisfy the token-based condition of the access control rule in connection with an earlier request.

4. The method of claim 3, wherein the request and the earlier request are requests for access to a limited access online resource.

5. The method of claim 4, wherein the computing system is an e-commerce system, and wherein the requests for access to a limited access online resource are requests to purchase a product item.

6. The method of claim 1, wherein the second blockchain network is a layer 2 blockchain related to the first blockchain network.

7. The method of claim 1, further comprising, after processing the request from the user device, causing minting of a new token on the second blockchain network, wherein the new token includes an identifier of the non-fungible token used to satisfy the access control rule.

8. The method of claim 7, wherein the new token further includes the wallet address provided by the user device.

9. The method of claim 8, wherein the new token includes metadata identifying a product item associated with the request.

10. The method of claim 1, wherein the data associated with the second blockchain network includes a token recorded on the second blockchain network containing a reference to a mutable payload, and wherein the method further includes accessing the mutable payload and determining that the mutable payload does not record more than a maximum number of uses of the non-fungible token.

11. The method of claim 10, wherein the reference points to an interplanetary name system that resolves to the mutable payload on an interplanetary file system, and wherein the mutable payload includes a count of previous uses of the non-fungible token to satisfy the access control rule.

12. A computing system, comprising:
one or more processing units;
one or more data storage units; and
memory storing processor-executable instructions that, when executed by the one or more processing units, are to cause the processing units to:

receive a request from a user device, the request being associated with an access control rule having a token-based condition and a type of use condition, verify satisfaction of the token-based condition based on a wallet address provided by the user device and blockchain data obtained from a first blockchain network confirming that a non-fungible token meeting the token-based condition is associated with the wallet address, obtain data associated with a second blockchain network based on the non-fungible token wherein the data relates to previous uses of the non-fungible token, and, in response, filter the data based on the type of use condition to obtain filtered data, and determine, based on the filtered data associated with the second blockchain network, that the non-fungible token is not exhausted, and responsive to the determination that the non-fungible token is not exhausted and to the verification of satisfaction of the token-based condition, process, by the computing system, the request from the user device.

13. The computing system of claim 12, wherein the data associated with the second blockchain network includes a token recorded on the second blockchain network.

14. The computing system of claim 13, wherein the token recorded on the second blockchain network is a token recording previous use of the non-fungible token to satisfy the token-based condition of the access control rule in connection with an earlier request.

15. The computing system of claim 14, wherein the request and the earlier request are requests for access to a limited access online resource.

16. The computing system of claim 15, wherein the computing system is an e-commerce system, and wherein the requests for access to a limited access online resource are requests to purchase a product item.

17. The computing system of claim 12, wherein the instructions, when executed by the one or more processing units, are to cause the processing units to, after processing the request from the user device, cause minting of a new token on the second blockchain network, wherein the new token includes an identifier of the non-fungible token used to satisfy the access control rule.

18. The computing system of claim 17, wherein the new token further includes the wallet address provided by the user device.

19. The computing system of claim 12, wherein the data associated with the second blockchain network includes a token recorded on the second blockchain network containing a reference to a mutable payload, and wherein the instructions, when executed by the one or more processing units, are to cause the processing units to access the mutable payload and determine that the mutable payload does not record more than a maximum number of uses of the non-fungible token.

20. A non-transitory computer-readable media storing processor-executable instructions, wherein the instructions, when executed, are to cause one or more processing units to:

receive a request from a user device, the request being associated with an access control rule having a token-based condition and a type of use condition, verify satisfaction of the token-based condition based on a wallet address provided by the user device and blockchain data obtained from a first blockchain network confirming that a non-fungible token meeting the token-based condition is associated with the wallet address, obtain data associated with a second blockchain network based on the non-fungible token wherein the data relates to previous uses of the non-fungible token, and, in response, filter the data based on the type of use condition to obtain filtered data, and determine, based on the filtered data associated with the second blockchain network, that the non-fungible token is not exhausted, and responsive to the determination that the non-fungible token is not exhausted and to the verification of satisfaction of the token-based condition, process, by the computing system, the request from the user device.

\* \* \* \* \*